US008616237B2

(12) United States Patent
Jansen et al.

(10) Patent No.: US 8,616,237 B2
(45) Date of Patent: Dec. 31, 2013

(54) MESOFLUIDIC TWO STAGE DIGITAL VALVE

(75) Inventors: John F. Jansen, Knoxville, TN (US); Lonnie J. Love, Knoxville, TN (US); Randall F. Lind, Loudon, TN (US); Bradley S. Richardson, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 412 days.

(21) Appl. No.: 13/020,626

(22) Filed: Feb. 3, 2011

(65) Prior Publication Data

US 2012/0199769 A1 Aug. 9, 2012

(51) Int. Cl.
*F16K 31/02* (2006.01)

(52) U.S. Cl.
USPC ...................................... 137/624.11; 137/613

(58) Field of Classification Search
USPC ................... 137/613, 624.11, 625.64, 625.65
See application file for complete search history.

(56) References Cited

U.S. PATENT DOCUMENTS 3,502,105 A 3/1970 Ernyei et al.
3,878,376 A * 4/1975 Sholes et al. ............. 137/624.11
4,557,185 A 12/1985 Harriman
4,750,520 A 6/1988 Heim et al.
4,826,130 A 5/1989 Griffith et al.
4,917,356 A 4/1990 Shirdavani
4,973,024 A 11/1990 Homma
5,067,688 A 11/1991 Tanimoto et al.
5,177,969 A 1/1993 Schneider
5,186,393 A 2/1993 Yie
5,211,371 A 5/1993 Coffee
5,345,963 A 9/1994 Dietiker
5,785,297 A 7/1998 Ha
5,865,418 A 2/1999 Nakayama et al.
5,984,258 A 11/1999 Knebel et al.
6,110,427 A * 8/2000 Uffenheimer ................ 137/501
6,247,678 B1 6/2001 Hines et al.
6,279,869 B1 8/2001 Olewicz
6,505,812 B1 1/2003 Anastas (Continued)

FOREIGN PATENT DOCUMENTS

CN 201 344 299 Y 11/2009
DE 30 30 766 A1 2/1982

(Continued)

OTHER PUBLICATIONS

International Search Report and Written Opinion dated Jul. 5, 2012 for International Application No. PCT/US2012/023231, 12 pages.

(Continued)

*Primary Examiner* — Kevin Lee
(74) *Attorney, Agent, or Firm* — Brinks Gilson & Lione

(57) ABSTRACT

A mesofluidic scale digital valve system includes a first mesofluidic scale valve having a valve body including a bore, wherein the valve body is configured to cooperate with a solenoid disposed substantially adjacent to the valve body to translate a poppet carried within the bore. The mesofluidic scale digital valve system also includes a second mesofluidic scale valve disposed substantially perpendicular to the first mesofluidic scale valve. The mesofluidic scale digital valve system further includes a control element in communication with the solenoid, wherein the control element is configured to maintain the solenoid in an energized state for a fixed period of time to provide a desired flow rate through an orifice of the second mesofluidic valve.

21 Claims, 5 Drawing Sheets

(56) References Cited

U.S. PATENT DOCUMENTS

| | | | |
|---|---|---|---|
| 6,840,257 | B2 | 1/2005 | Dario et al. |
| 6,843,465 | B1 | 1/2005 | Scott |
| 7,055,793 | B2 | 6/2006 | Biehl et al. |
| 7,448,411 | B2 | 11/2008 | Friedman et al. |
| 7,815,161 | B2 | 10/2010 | Saitoh et al. |
| 8,118,054 | B2 | 2/2012 | Glaudel et al. |
| 2006/0264974 | A1 | 11/2006 | Khachin et al. |
| 2008/0105789 | A1 | 5/2008 | Smith et al. |
| 2008/0127768 | A1 | 6/2008 | Shirai et al. |
| 2010/0155633 | A1 | 6/2010 | Pfaff |
| 2010/0176323 | A1 | 7/2010 | Nguyen et al. |
| 2010/0199982 | A1 | 8/2010 | Hansen |
| 2011/0042605 | A1 | 2/2011 | Gyger et al. |
| 2011/0196509 | A1 | 8/2011 | Jansen et al. |
| 2012/0104292 | A1 | 5/2012 | Kollar et al. |
| 2012/0160334 | A1 | 6/2012 | Deperraz et al. |

FOREIGN PATENT DOCUMENTS

| | | | |
|---|---|---|---|
| DE | 37 37 143 | A1 | 5/1989 |
| DE | 40 37 621 | A1 | 6/1992 |
| DE | 43 22 731 | A1 | 1/1995 |
| EP | 0 117 208 | A1 | 8/1984 |

OTHER PUBLICATIONS

International Search Report and Written Opinion dated May 7, 2012 for PCT Application No. PCT/US2012/023459, 12 pages.
International Search Report and Written Opinion dated May 9, 2012 for PCT Application No. PCT/US2012/023230, 13 pages.
Lonnie J. Love et al., "Mesofluidic Actuation for Articulated Finger and Hand Prosthetics", 2009 IEEE/RSJ International Conference on Intelligent Robots and Systems, St. Louis, USA, pp. 2586-2591.
International Search Report and Written Opinion for PCT Application No. PCT/US2012/023094 dated Mar. 28, 2012.

* cited by examiner

MESOFLUIDIC TWO STAGE DIGITAL VALVE

GOVERNMENT INTEREST

The inventions were made with government support under Prime Contract No. DE-AC05-00OR22725 awarded by the U.S. Department of Energy. The government has certain rights in the inventions.

CROSS-REFERENCE TO RELATED APPLICATION

This patent relates to co-pending U.S. patent application Ser. No. 13/020,633, entitled, "Mesofluidic Shape Memory Alloy Valve", filed on Feb. 3, 2011; co-pending U.S. patent application Ser. No. 13/020,620, entitled, "Mesofluidic Digital Valve", filed on Feb. 3, 2011; and co-pending U.S. patent application Ser. No. 13/020,610, entitled, "Mesofluidic Controlled Robotic or Prosthetic Finger", filed on Feb. 3, 2011; the contents of these applications are hereby incorporated herein by reference for all purposes.

BACKGROUND

Hydraulics and flow control concepts are utilized in positioning and lifting applications. Hydraulics and flow control are often segmented based on the operational requirements and pressure utilized for a given application. For example, in many heavy lifting applications the hydraulics and flow controls are designed to work in high pressure and high flow configurations. These applications include operating pressures in excess of one-thousand pounds per square inch (>1000 psi) and flow rates measured in gallons per minutes (G/min). In high pressure and high flow applications, the actuators are typically constructed to provide the mechanical strength calculated to withstand the stresses and forces to which they may be subjected. In another example, biomedical devices and other precision, low force applications are designed to work in low pressure and low flow configurations. These low flow applications include operating pressures at pressures below one hundred pounds per square inch (<100 psi) and flow rates measured in milliliters per second (ml/sec). The actuators in low flow, low pressure applications are typically precision and/or miniature devices capable of providing a minimal force.

The limitations inherent in both the high pressure/high flow and low pressure/low flow applications effect the development of robotic and/or prosthetic appendages such as robotic and/or prosthetic fingers and/or hands. For example, a robotics and/or prosthetic appendage configured for a high pressure/high flow application to generate large forces and/or provide a quick response may be bulky and be difficult to precisely control. Alternatively, a robotics and/or prosthetic appendage configured for a low pressure/low flow application to provide precision control may be slow to respond and unable to generate large forces. Accordingly, actuators, valves, controls and devices that address these limitations are desirable.

DETAILED DESCRIPTION

Figure 1:
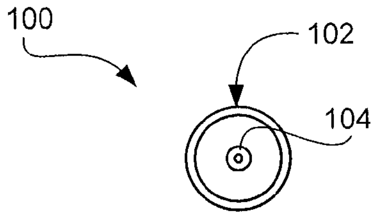
FIG. 1 illustrates an end view of an exemplary shape memory alloy thermal valve constructed in accordance with the disclosure provided herein.

Mesofluidics, as used herein, describes a class or configuration of hydraulic actuators designed to operate at high pressures and low flow rates. Mesofluidic actuators range in size and configuration from a few millimeters to one or more centimeters in length and may, in one or more embodiments, be cylindrical. Mesofluidics actuators may be configured to provide high force density (>1000 psi), low friction, direct drive and high mechanical bandwidth while utilizing a variety of working fluids ranging from oil to water to synthetics. An exemplary mesofluidic actuator may be 2.3 mm (0.09 inches) in diameter and configured to generate or provide 1.09 kg (2.4 lbs) of force with 7.6 mm (0.3 inches) of displacement. Alternatively, another mesofluidic actuator may be 9.6 mm (0.38 inches) in diameter and configured to generate or provide 8.9 kg (19.8 lbs) of force with 25.4 mm (1.0 inches) of displacement. Both exemplary mesofluidic actuators are configured to provide a dynamic response exceeding equivalent human muscle actuation.

Hydraulic control valves control the flow of fluid moving into and out of a hydraulic actuator, thereby controlling the actuator velocity. Known high pressure/high flow and low pressure/low flow valves typically utilize an orifice having a variable area to control fluid flow (and consequently the speed of the valve). Regardless of the type of application (e.g., high pressure/high flow and low pressure/low flow), the valves typically utilize orifices which have comparable area. Mesofluidic valves, by way of contrast, utilize extremely small orifices in order to control or provide for the low flow demand in a high pressure environment. The orifices utilized in mesofluidic valves are often orders of magnitude smaller than an orifice utilized in known valves. For example, a valve configured to provide flow rates lower than a ml/sec at pressures greater than 2000 psi requires an orifice having a diameter less than a few thousandths of an inch.

The present disclosure describes two classes of mesofluidic (high pressure/low flow) control valves: (I) the Shape Memory Alloy (SMA) thermal valve and (II) the digital valve. The exemplary thermal SMA valve disclosed herein is a poppet style valve actuated by a liquid cooled shape memory alloy. In this embodiment, the shape memory alloy is formed into a wire that is configured to shrink when heated by an electrical current passed there through. The more current, and subsequently heat, passed through the wire, the faster is contracts. Contraction of the SMA wire portion of the valve causes the attached poppet to disengage from the orifice and fluid to flow there through. By adjusting the current and heat of the SMA wire, the opening between the orifice and the poppet can be controlled. The orifice, in one exemplary embodiment, may be manufactured from an exotic material such as sapphire and ruby to provide an orifice diameter as small as four tenthousands of an inch (0.0004 inches).

The responsiveness and/or performance of the SMA thermal valve may be controlled by regulating the temperature of the SMA wire. For example, in order to open the actuator quickly, current may be applied to the SMA wire to generate heat thereby causing the wire to contract and opening the orifice. However, in order to close the actuator quickly, the SMA wire must be cooled to allow the SMA wire to expand in cooperation with a compression spring to reseat the poppet in the orifice. In order to cool the SMA wire quickly, fluid flow from the orifice (i.e., the input port) is directed around the SMA wire (which is disposed in the fluid flow path) and the moving flow helps remove the heat from the SMA wire thereby causing it to cool and the valve to close. The SMA thermal valve provides a simple and low cost means of control fluid in a high pressure/low flow system.

The exemplary mesofluidic digital valve disclosed herein may be configured to finely regulate flow rate through an orifice. Control or regulation of the flow rate through the valve may be further complicated because the difference between "fully open" and "fully closed" may be only a few thousandths of an inch. Thus, in order to provide a flow resolution of 1% requires the ability to control the actuator opening within $10e^{-6}$ inches. The degree of actuator control necessary to ensure the required flow resolution may be difficult, if not impossible, in practical implementations. The exemplary mesofluidic digital valve addresses this difficulty modulating the fluid flow digitally. In particular, the exemplary mesofluidic digital valve utilizes a solenoid to drive a poppet between a fully open position and a fully closed position. In this way, fluid flow may be controlled not by varying the size or area of the orifice but rather by controlling how long (i.e., the amount of time) the valve is open rather than how wide it is open. The exemplary mesofluidic digital valve provides a responsive mechanism or means for controlling fluid flow.

The mesofluidic mechanisms and actuators disclosed herein are well-suited for use in the design and construction of robotic and/or prosthetic fingers and thumbs. In particular, the mesofluidic mechanisms, valves and actuators allow for the design of robotic and/or prosthetics devices that achieve high performance actuation within the volumetric constraints of the human fingers and hand. Moreover, the disclosure provided herein may be scaled and adapted to other robotic and/or prosthetic joints or appendages such as, for example, ankles, wrists, elbows, shoulders and knees.

I. Mesofluidic Shape Memory Alloy Thermal Valve

Figure 2:
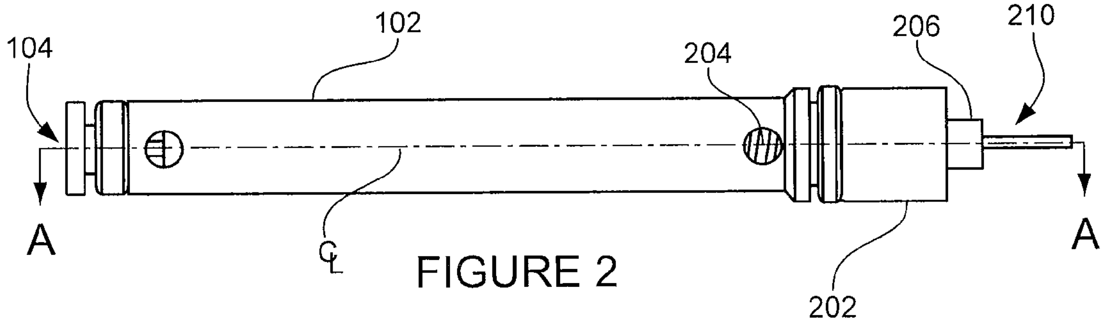
FIG. 2 illustrates a side view of the exemplary shape memory alloy thermal valve shown in FIG. 1.
Figure 3:
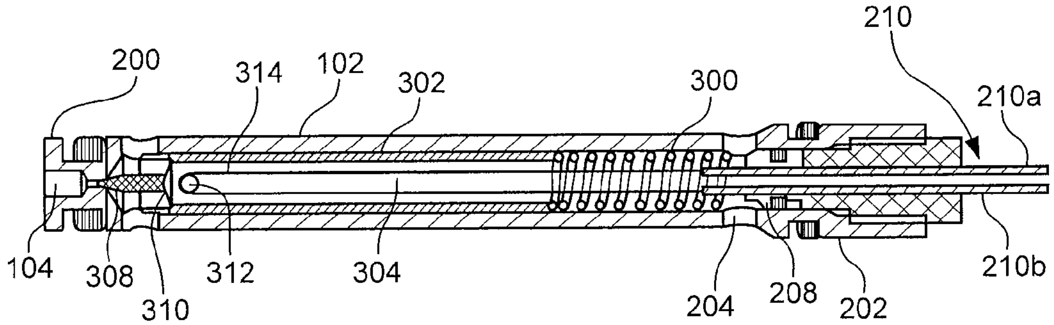
FIG. 3 illustrates a cross sectional view of the exemplary shape memory alloy thermal valve shown in FIG. 1.

FIGS. 1 to 4 illustrate an end view, a side view, a cross sectional view and an assembled view including a controller of an exemplary shape memory alloy thermal valve 100, respectively. In particular, the exemplary shape memory alloy thermal valve 100 shown in FIGS. 1 to 3 is a cylindrical cartridge actuator. FIG. 1 illustrates an end view of a cylindrical body 102. The cylindrical body 102 includes an inlet port 104 disposed along the axial centerline CL of the shape memory alloy thermal valve 100 as shown in FIG. 2. The cylindrical body 102, in an exemplary embodiment, has a diameter of 0.188 inches and an overall length of 1.450 inches. The overall size and/or dimensions of the cylindrical body 102 may, it will be understood, scaled depending upon the intended use of the shape memory alloy thermal valve 100.

FIG. 2 illustrates a side view of the exemplary shape memory alloy thermal valve 100. The cylindrical body 102 extends along the axial centerline CL between the inlet port 104 (see FIG. 1) formed at a first end 200 of the cylindrical body 102 and an outlet port 204 disposed substantially adjacent to a second end 202 of the cylindrical body 102. The second end 202 is configured to support an end cap 206. In particular, the end cap 206 is carried within the cylindrical body 102 at the second end 202. The end cap 206 includes a seal 208 (see FIG. 3) to prevent fluid flow past the outlet port 204. The end cap 206 may further carry connectors generally identified by the reference numeral 210. The individual connectors may be specifically identified by the reference numerals 210*a* and 210*b* (see FIG. 3).

FIG. 3 illustrates a cross-sectional view taken along the second line A-A shown in FIG. 2. FIG. 3 illustrates the second end 202 carrying the end cap 206 and the individual connectors 210*a* and 210*b*. As previously discussed, the end cap 206 cooperates with the seal 208 to fluidly seal the interior of the cylindrical body 102 against leaks.

The end cap 206 further cooperates and engages with a bias or spring 300 carried within the interior of the cylindrical body 102. The bias or spring 300, in turn, compresses and engages a poppet body 302 slideably carried within the interior of the cylindrical body 102. The poppet body 302, like the cylindrical body 102, is a substantially hollow cylinder that extends along the axial centerline CL. The substantially hollow poppet body 302 and the cylindrical body 102 cooperate to define a fluid flow path 304 between the inlet port 104 and the outlet port 204.

The poppet body 302 further includes and supports a poppet 306. The poppet 306 extends linearly away from the poppet body 302 along the axial centerline CL and towards the inlet port 104. The poppet 306 is configured to engage an orifice 308 carried by the inlet port 104. The orifice 308, in this exemplary embodiment, may be formed or manufactured in an exotic material such as sapphire or ruby as well as conventional materials such as steel, aluminum or titanium. The orifice 308 may have a diameter between 0.0004 inches to 0.024 inches depending on the desired flow rate, fluid type and operating pressure. The poppet 306, in this exemplary embodiment, has a tapered or cone-shaped end configured to engage the orifice 308. Alternative, the poppet 306 could include a spherical or round end configured to engage the orifice 308. Regardless of the specific size and/or shape of the poppet 306, in operation the poppet 306 is configured to engage the orifice 308 to establish a fluid seal and block the fluid flow along the fluid flow path 304.

The poppet 306 may be secured and suspended along the axial centerline CL of the poppet body 302 via, for example, one or more spokes 310 secured to an inner surface of the poppet body 302. The spokes 310 allow fluid to flow through the interior of the poppet body 302 when fluid is flowing through the inlet port 104 (i.e., when the inlet port 104 is not sealed by the poppet 306).

The poppet body 302 may further include a post 312 extending across the interior of the substantially hollow cylinder. In particular, the post 312 is positioned substantially adjacent to the poppet 306 and transverse to the fluid flow path 304. A shape memory alloy (SMA) wire 314 may stretch along the fluid flow path 304 from the first connector 210*a* to the post 312. At the post 312, the SMA wire 314 may wrap around the periphery of the post 312 and stretch back to the second connector 210*b*. The SMA wire 314 may be electrically connected to the connectors 210*a*, 210*b* to form a circuit. Passing a current through the connector 210 causes the SMA wire 314 to heat up and contract. As the SMA wire 314 contracts, the poppet 306 and the poppet body 302 are pulled away from the orifice 308 by the interaction of the SMA wire 314 and the post 312. In particular, as the SMA wire 314 heats up and contracts, it pulls against the post 312 which caused the poppet body 302 to bear against and compress the spring 300. As the poppet 306 disengages from the orifice 308 in response to the movement of poppet body 302, high pressure fluid flows from the inlet port 104 to the outlet port 204 along the fluid flow path 304.

The flow rate Q through the orifice 308 may be described by the relationship:

$$Q = C_d A_v \sqrt{\frac{2\Delta P}{\rho}}$$

Where $C_d$ is the discharge coefficient (typically 0.61), $A_v$ is the orifice area, ΔP is the pressure difference across the actuator and p is the fluid density. Mathematically, the orifice area $A_v$ is equivalent to $\pi d_v$, where $d_v$ is the diameter the orifice. Utilizing the exemplary numbers discussed above, when the diameter of the orifice $d_v$ is 0.0004 inches, the corresponding orifice area $A_v$ is very small. Accordingly, even for very large values of ΔP (i.e., even at high pressures), the flow rate Q will remain low.

Figure 4:
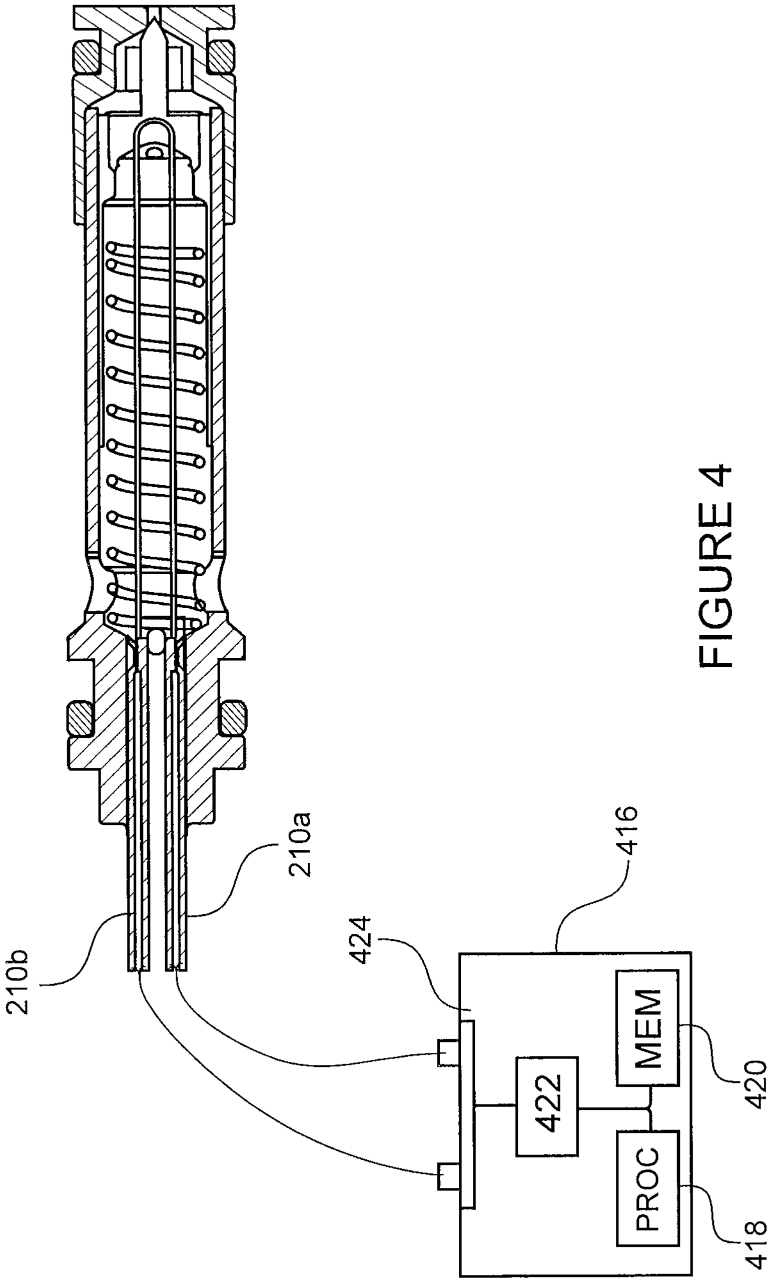
FIG. 4 illustrates a controller that may be utilized with a valve disclosed herein.

In operation, a high pressure fluid source (not shown) may be fluidly coupled to the exemplary shape memory alloy thermal valve 100 via the inlet port 104 and an exhaust (not shown) may be fluidly coupled to the outlet port 204. As illustrated in FIG. 4, the connectors 210*a* and 210*b* may be connected to a controller 416 that includes a processor 418 in communication with a memory 420. The memory 420 may be configured to store instructions and commands executable by the processor 418. The processor 418 and memory 420 may further be in communication with a power source 422 and a communication module 424. The communication module 424 may be configured to communicate with the exemplary shape memory alloy thermal valve 100 and/or other external devices. For example, a single controller 416 may control and drive multiple the shape memory alloy thermal valve 100. Alternatively, the controller 416 may utilize known wired (e.g., TCP-IP, Ethernet) and/or wireless (e.g., 802.11 , 802.15 and 802.16) networking communication protocols to communicate with other controllers 416 and/or devices.

In operation, the exemplary shape memory alloy thermal valve 100 may be sealingly coupled to a high pressure fluid source via the inlet port 104, and a drain or outlet via the outlet port 204. At a predetermined time, in response to a predefined event or condition, the controller 416 may activate the power source 422 and deliver an electrical current to the connectors 210*a* and 210*b*. The connectors 210*a* and 210*b* cooperate with the SMA wire 314 to form a resistance circuit and generate heat in the SMA wire 314.

The SMA wire 314 contracts in response to the generated heat and bears against the post 312. Contraction of the SMA wire 314 causes the bias 300 to compress and pulls the poppet body 302 away from the first end 200. The poppet 306 moves in cooperation with the poppet body 302 away from the orifice 308 in response to the contraction of the SMA wire 314. In particular, as the SMA wire 314 heats up and contracts, it pulls against the post 312 which caused the poppet body 302 to bear against and compress the spring 300.

As the poppet 306 disengages from the orifice 308 in response to the movement of poppet body 302, high pressure fluid flows from the inlet port 104 to the outlet port 204 along the fluid flow path 304. The high pressure fluid flows through the small area of the orifice $A_v$ at a low flow rate Q and along the length of the SMA wire 314 suspended in the fluid flow path 304.

The controller 416 may, in response to a received condition or signal and/or a program command, disconnect or cease transmission of the electrical current to the connectors 210*a* and 210*b*. In the absence of the electrical current, the SMA wire 314 is no longer heated and may begin to expand. Expansion of the SMA wire 314 may be encouraged by the force exerted by the spring 300. Expansion of the SMA wire 314 may further be encouraged by the fluid flow along the fluid flow path 304. In particular, the movement of the fluid along the SMA wire 314 between the inlet port 104 and the outlet ort 204 may cool the SMA wire 314 and help remove excess heat. In this way, the spring 300 and the SMA wire 314 may be configured to simply and responsively control the flow of high pressure fluid through the orifice 308.

II. Mesofluidic Digital Valve

Figure 5:
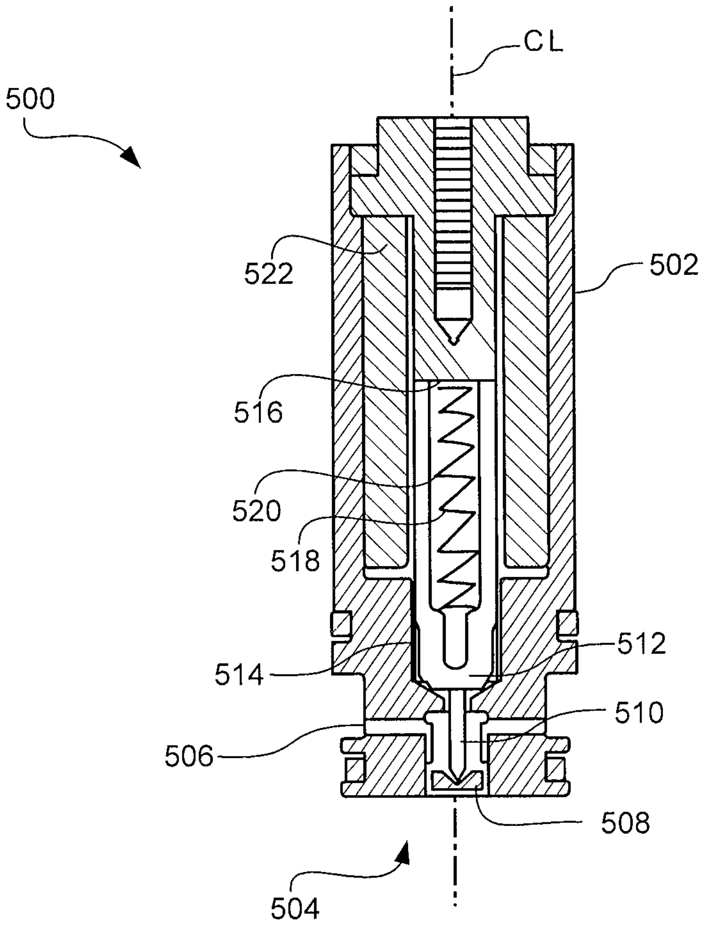
FIG. 5 illustrates a cross sectional view of a digital valve constructed in accordance with the disclosure provided herein.

FIG. 5 illustrates a cross sectional view of an exemplary mesofluidic digital valve 500. The exemplary digital valve 500 is a cylindrical cartridge valve having a cylindrical body 502. The cylindrical body 502 includes an inlet port 504 disposed along the axial centerline CL and an outlet port 506 disposed substantially perpendicular and adjacent to the inlet port 504.

The inlet port 504 carries an exotic material orifice 508 configured to cooperate with a poppet 510 portion of a poppet body 512. The exotic material orifice may be, for example, a ruby or sapphire orifice having a fluid passage formed there through or may be made from conventional materials such as nonferrous stainless steel or titanium. The diameter of the passage may be as small as 0.0004" or as high as 0.024". The poppet 510 and the orifice 508 cooperate to block fluid flow between the inlet port 504 and the outlet port 506. As shown in FIG. 5, the poppet body 512 is carried within a poppet chamber 514 portion of the cylindrical body 502 and extends along the axial centerline CL. The poppet body 512 is sized to define a gap 516 with respect to the back surface of the poppet chamber 514. The gap 516 defines and limits the travel of the poppet 510 with respect to the orifice 508. The poppet body 512 is configured to carry a spring 518 within a spring cavity 520 defined along the axial centerline CL. The spring 518 biases the poppet body 512 away from the back surface of the poppet chamber 514 such that the poppet 510 engages the orifice 508.

The cylindrical body 502 further carries a solenoid 522 configured to magnetically couple to the poppet body 512. For example, when the solenoid 522 is charged and generating a magnetic field, the conductive material of the poppet body 512 will be encouraged to translate away from the orifice 510 the distance of the gap 516. The translation of the poppet body 512 causes the spring 518 to compress under the influence of the motive force imparted by the magnetic field.

The solenoid 522 may be connected to and/or controlled by the controller 416 (see FIG. 4) that includes the processor 418 in communication with the memory 420. The memory 420 configured to store instructions and commands executable by the processor 418. The processor 418 and memory 420 further in communication with a power source 422 and a communication module 424. The communication module 424 may be configured to communicate with and control the mesofluidic digital valve 500.

In operation, the controller 416 may execute a program or other series of stored instructions or commands that energizes the solenoid 522 to translate the poppet body 512 and compress the spring 518. In this way, the poppet 510, which is fixedly attached to the poppet body 512, translates away from the orifice the fixed distance of the gap 516. The flow rate through the orifice 508 is controlled by the amount or period of time the solenoid 522 remains energized by the controller 416. In this way, the specific position of the poppet 510 need not be controlled with extreme precision because the flow rate through the orifice 508 is not controlled by the variable position of the poppet 510 relative to the orifice 508; rather, the flow between the inlet port 504 and the outlet port 506 is controlled by the time the orifice 508 is open.

Figure 6:
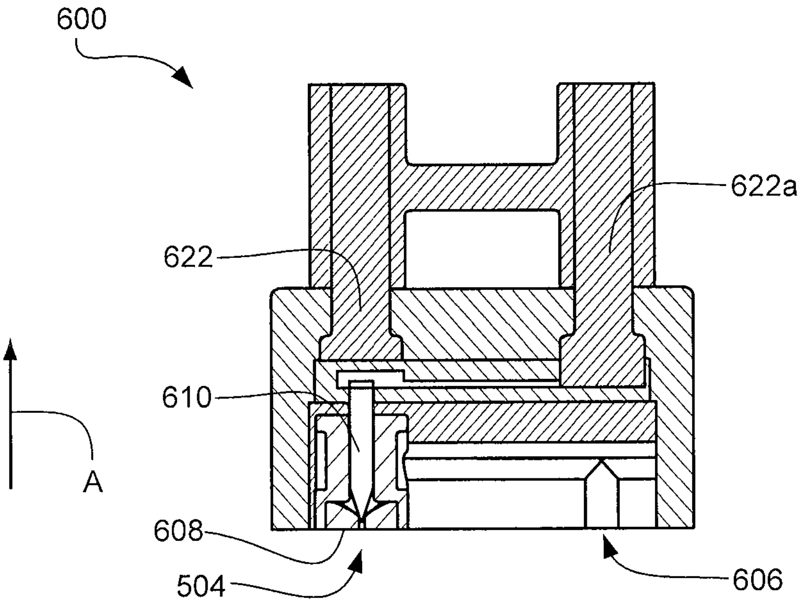
FIG. 6 illustrates an alternate embodiment of the digital valve shown in FIG. 5.

FIG. 6 illustrates an alternate embodiment of a digital valve 600 configured prevent leakage. In this exemplary embodiment, the solenoid 622 utilizes a horseshoe magnetic path where the electrical coils 622*a* are located outside the valve, eliminating the need to pass magnetic wires and/or electrical connections into the fluid flow path. In this embodiment, a flexure 630 is coupled to a poppet 610. When the solenoid 622 is energized, the flexure moves in the direction indicated by the arrow A and pulls the poppet 610 away from the orifice 608 carried within the inlet port 604. When the poppet 610 is moved away from the orifice 608, fluid can flow under high pressure from the inlet port 604 to the outlet port 606.

III. Mesofluidic Two-Stage Digital Valve

Figure 7:
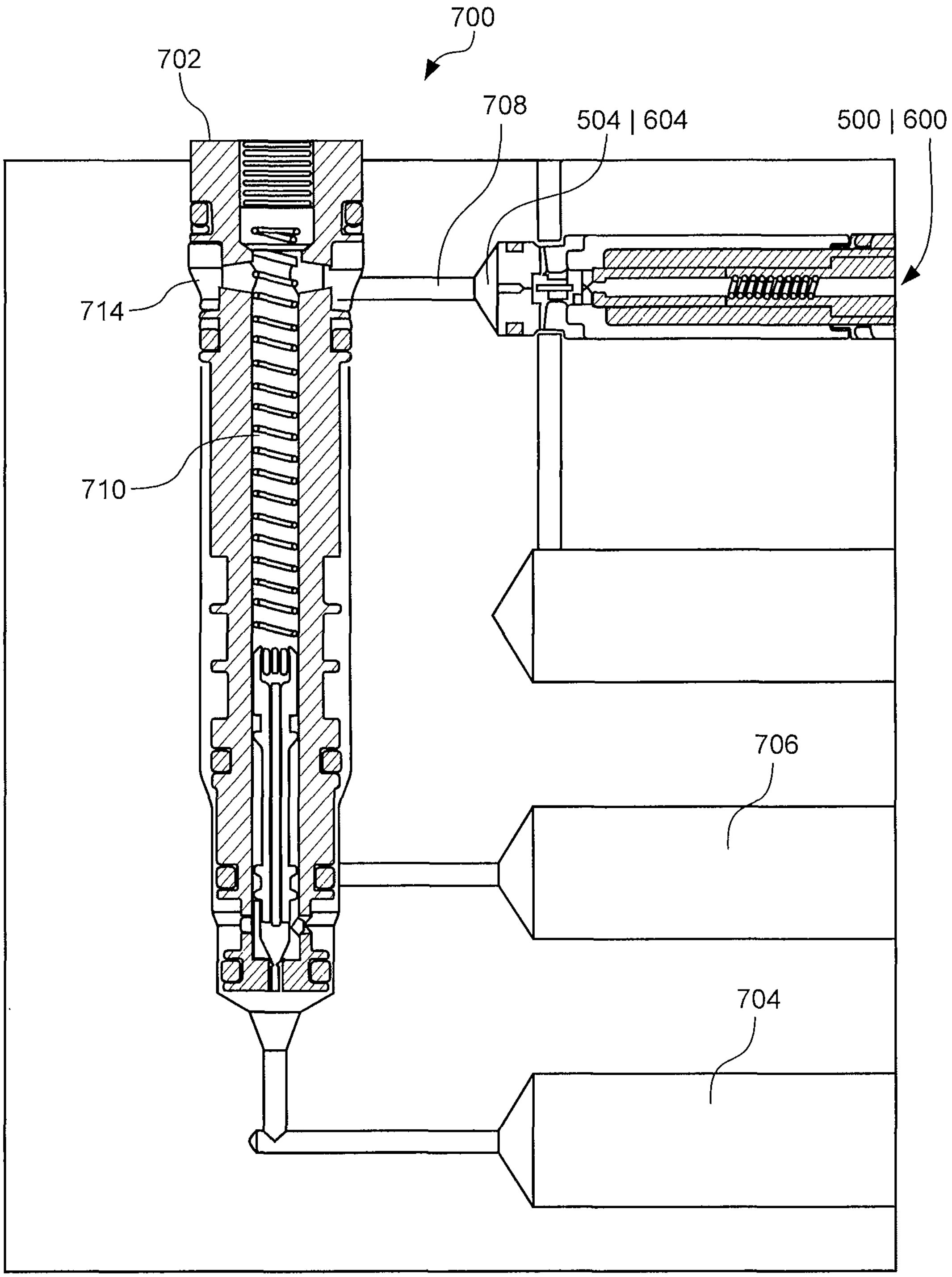
FIG. 7 illustrates a cross sectional view of a two-stage digital valve constructed in accordance with the disclosure provided herein.

FIG. 7 illustrates an exemplary embodiment in which the digital valve 500 (and/or 600) may be utilized as a first stage for controlling a second, larger poppet valve valve 702 of a two-stage valve 700. In particular, the digital valve 500 may be utilized to regulate and/or control the pressure within a poppet chamber 714 of the second stage 702. In particular, the inlet port 504/604 is in fluid communication with the poppet chamber 714 via the fluid passage 708. The second stage or second valve 702 may be a high pressure/high flow valve configured to control the flow between a high pressure input port 704 and a high pressure outlet port 706. The poppet chamber 714 is in fluid communication with the high pressure inlet port 704.

In operation, the digital valve 500 may be utilized to control the flow through the second stage 702. In particular, when the digital valve 500 is open, fluid escapes from the poppet chamber 714 via the fluid passage 708 and the fluid pressure within the poppet chamber 714 is correspondingly decreased. The decreased pressure in the poppet chamber 714 allows the high pressure provided via the high pressure inlet port 704 to overcome the spring force provided by the spring 710. The greater the amount fluid allowed to escape via the fluid passage 708, the lower the pressure within the poppet chamber 714 and the more the second stage 702 opens. In this manner, the digital valve 500/600, which utilizes little electrical power for operation, may be utilized to control the second stage 702 (which, in a known system or valve, would require a great deal of power to control).

In another embodiment, the orifice of the second stage 702 is fixed orifice having an area that is smaller than the area of the orifice of the digital valve 500/600. In this way area fine control of the pressure on the back side of the second stage 702 may be established and fine control of the poppet position may be maintained.

The inclusion of the digital valve 500/600 provides a responsive, efficient and quickly controlled two-stage valve 700. The digital modulation of the fluid in the poppet chamber 714 provides for smooth flow with minimal pressure pulsations within the two-stage valve 700. The spring 710 may, in an embodiment, be a stiff spring (relative to the pressure at the inlet port 704) having a large spring constant. Alternatively, the spring 710 may be a weak spring and the two-stage valve 700 may include both a poppet position feedback with a linear variable differential transformer (LVDT) and a pressure feedback of the poppet chamber 714 with a pressure sensor.

IV. Mesolfuidic Controlled Robotic and/or Prosthetic Finger

Figure 8:
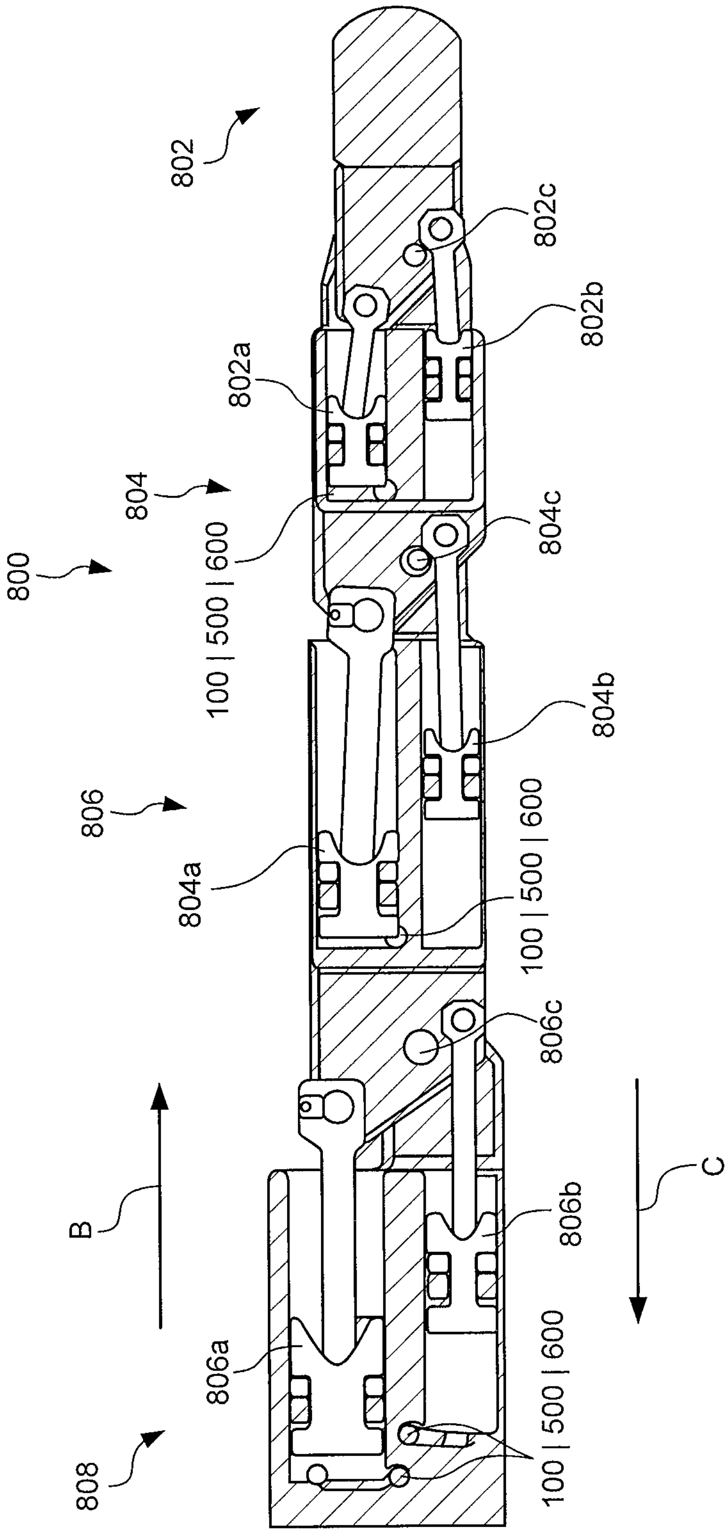
FIG. 8 illustrates an embodiment of a robotic or prosthetic finger constructed in accordance with the disclosure provided herein.

FIG. 8 illustrates a cross-sectional view of an exemplary mesofluidic controlled robotic and/or prosthetic finger 800.

The robotic and/or prosthetic finger 800 includes robotic and/or prosthetic segments 802, 804, 806 pivotally coupled to a base segment 808. The robotic and/or prosthetic finger 800 is a hydraulic finger operating at high pressures and low flow rates. For example, the robotic and/or prosthetic finger 800 may be configured to generate 20 lbs of force without the need for external cables or actuators. Because the robotic and/or prosthetic finger 800 is substantially self-contained, the robotic and/or prosthetic finger 800 may be utilized in cases where limitation amputations or digit loss has been experience.

Each robotic and/or prosthetic segment 802 to 806 cooperates with a pair of counter-acting high pressure/low flow pistons 802*a/b* to 806*a/b*, respectively. Each of the pistons 802*a/b* to 806*a/b* cooperates to encourage the corresponding robotic and/or prosthetic segment 802 to 806 to rotate about pivot points 802*c* to 806*c*. The pivot points 802*c* to 806*c* and the pistons 802*a/b* to 806*a/b* are arranged to cam and control the movement of the robotic and/or prosthetic finger 800 in a life like manner.

Each of the pistons 802*a/b* to 806*a/b* may include one or more digital valves 500/600 and/or shape memory alloy thermal valves 100. In this manner, the robotic and/or prosthetic finger 800 may be operated at a high pressure to generate a large force while simultaneously operating at a low flow rate that provides precise control.

In operation, each of the pistons 802*a/b* to 806*a/b* is maintained under pressure. For example, piston 806*a* may be experiencing increasing pressure and extending in the direction indicated by the arrow B, while the piston 806*b* is experiencing decreasing pressure and retracting in the direction indicated by the arrow C. The counter movement of the pistons 806*a* and 806*b* cause the robotic and/or prosthetic segment 806 to rotate about the pivot point 806*c* in the direction indication by the arrow D. By reversing the flows to the pistons 806*a/b*, the movement of robotic and/or prosthetic section 806 may be reversed. These principles may be similarly and independently applied to the robotic and/or prosthetic segments 804 and 802.

The integration of the valve 100/500/600 with the finger segment 802 to 806 provides a simple design in which the piston bores of the pistons 802*a/b* to 806*a/b* are part of the mechanical structure of the finger. Fluid may be routed through each finger segment 802 to 806 via tubes or cross-drilled holes controlled via the valves 100/500/600.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A mesofluidic scale digital valve system comprising:
  - a mesofluidic first-stage valve comprising:
    - a valve body including a bore, wherein the valve body is configured to cooperate with a solenoid disposed substantially adjacent to the valve body to translate a poppet carried within the bore;
    - an orifice carried within the valve body and configured to cooperate with the position of the poppet;
    - a bias element configured to encourage the poppet to engage the orifice;
  - a second-stage valve disposed substantially perpendicular to the mesofluidic first-stage valve, the second-stage valve comprising:

a valve body including a bore sized to accept a translatable poppet;

an orifice carried within the valve body and configured to cooperate with the position of the poppet;

a bias element configured to encourage the translatable poppet to engage the orifice;

a fluid chamber defined by the cooperation of a rear portion of the translatable poppet and the valve body, the fluid chamber in fluid communication with the orifice of the mesofluidic first-stage valve; and a control element in communication with the solenoid, wherein the control element is configured to maintain the solenoid in an energized state for a fixed period of time to provide a desired flow rate through the orifice of the second-stage valve, wherein the orifice of the second-stage valve is a fixed orifice that has an area that is smaller than an area of the mesofluidic first-stage valve.

2. The mesofluidic scale digital valve system of claim 1, wherein the solenoid cooperates with an outer surface of the valve body.

3. The mesofluidic scale digital valve system of claim 1, wherein the solenoid is a substantially cylindrical solenoid having a solenoid bore formed along a longitudinal axis, and wherein the substantially cylindrical solenoid is sized to support at least a portion of the valve body within the solenoid bore.

4. The mesofluidic scale digital valve system of claim 1, wherein the control element includes a memory storing programming codes executable by a processor in communication with the memory and wherein the processor includes a timing element.

5. The mesofluidic scale digital valve system of claim 1, wherein at least one of the orifice of the mesofluidic first-stage valve or the second stage valve is made from a material selected from the group consisting of ruby and sapphire.

6. The mesofluidic scale digital valve system of claim 1, wherein the first mesofluidic scale valve is disposed substantially perpendicular to the second mesofluidic scale valve.

7. A mesofluidic scale digital valve system comprising:

a first mesofluidic scale valve comprising:

a valve body including a bore, wherein the valve body is configured to cooperate with a solenoid disposed substantially adjacent to the valve body to translate a poppet carried within the bore;

an orifice carried within valve body and configured to cooperate with the poppet in response to a magnetic field generated by the solenoid;

a bias element carried within the valve body and configured to encourage the poppet to engage the orifice to form a seal;

a second mesofluidic scale valve comprising:

a valve body including a bore;

a solenoid disposed substantially adjacent to the valve body;

a poppet carried within the bore and configured to translate a fixed distance in response to a magnetic field generated by the solenoid;

an orifice carried within the valve body and configured to cooperate with the poppet in response to the magnetic field generated by the solenoid;

a bias element carried within the valve body and configured to encourage the poppet to engage the orifice to form a seal;

a fluid chamber defined by the cooperation of a rear portion of the poppet and the valve body, the fluid chamber in fluid communication with the orifice of the first mesofluidic scale valve; and a control element in communication with the solenoids in each of the first and second mesofluidic valve, wherein the control element is configured to:

energize the solenoids to generate magnetic fields and translate the poppet the fixed distance away from the seal; and maintain the solenoid of at least the first mesofluidic valve in an energized state for a fixed period of time to provide a desired flow rate through the orifice of the second mesofluidic valve.

8. The mesofluidic scale digital valve system of claim 7, wherein the solenoid of at least the second mesofluidic scale valve cooperates with an outer surface of the valve body.

9. The mesofluidic scale digital valve system of claim 7, wherein each of the solenoids is a substantially cylindrical solenoid having a solenoid bore formed along a longitudinal axis, and wherein the substantially cylindrical solenoid is sized to support at least a portion of the valve body within the solenoid bore.

10. The mesofluidic scale digital valve system of claim 7, wherein the control element includes a memory storing programming codes executable by a processor in communication with the memory and wherein the processor includes a timing element.

11. The mesofluidic scale digital valve system of claim 7, wherein at least one of the orifices is made from a material selected from the group consisting of ruby and sapphire.

12. The mesofluidic scale digital valve system of claim 7, wherein the orifice of the second mesofluidic scale valve is a fluid input.

13. The mesofluidic scale digital valve system of claim 7, wherein the first mesofluidic scale valve is disposed substantially perpendicular to the second mesofluidic scale valve.

14. The mesofluidic scale digital valve system of claim 7, wherein the bias elements of each of the first mesofluidic scale valve and the second mesofluidic scale valve is a compression spring.

15. A mesofluidic scale digital valve system comprising:

a first mesofluidic scale valve comprising:

a valve body including a bore, wherein the valve body is configured to cooperate with a solenoid disposed substantially adjacent to the valve body to translate a poppet carried within the bore;

an orifice carried within valve body and configured to cooperate with the position of the poppet;

a bias element configured to encourage the poppet to engage the orifice;

a second mesofluidic scale valve disposed substantially perpendicular to the first mesofluidic scale valve, the second mesofluidic scale valve comprising:

a valve body including a bore, wherein the valve body is configured to cooperate with a solenoid disposed substantially adjacent to the valve body to translate a poppet carried within the bore;

an orifice carried within valve body and configured to cooperate with the position of the poppet;

a bias element configured to encourage the poppet to engage the orifice;

a fluid chamber defined by the cooperation of a rear portion of the poppet and the valve body, the fluid chamber in fluid communication with the orifice of the first mesofluidic scale valve; and a control element in communication with the solenoids in each of the first and second mesofluidic scale valves, wherein the control element is configured to maintain the solenoid of at least the first mesofluidic scale valve in an energized state for a fixed period of time to provide a desired flow rate through the orifice of the second mesofluidic scale valve.

16. The mesofluidic scale digital valve system of claim 15, wherein the solenoid of at least the second mesofluidic scale valve cooperates with an outer surface of the valve body.

17. The mesofluidic scale digital valve system of claim 15, wherein each of the solenoids is a substantially cylindrical solenoid having a solenoid bore formed along a longitudinal axis, and wherein the substantially cylindrical solenoid is sized to support at least a portion of the valve body within the solenoid bore.

18. The mesofluidic scale digital valve system of claim 15, wherein the control element includes a memory storing programming codes executable by a processor in communication with the memory and wherein the processor includes a timing element.

19. The mesofluidic scale digital valve system of claim 15, wherein at least one of the orifices is made from a material selected from the group consisting of ruby and sapphire.

20. The mesofluidic scale digital valve system of claim 15, wherein the orifice of the second mesofluidic scale valve is a fluid input.

21. The mesofluidic scale digital valve system of claim 15, wherein the bias elements of each of the first mesofluidic scale valve and the second mesofluidic scale valve is a compression spring.

* * * * *